United States Patent
Saby et al.

(10) Patent No.: US 11,934,598 B2
(45) Date of Patent: Mar. 19, 2024

(54) DISPLACEMENT DETECTION CIRCUIT AND METHOD THEREOF

(71) Applicant: EM MICROELECTRONIC-MARIN SA, Marin (CH)

(72) Inventors: Jérôme Saby, Colombier (CH); Lorenzo Pierobon, Neuchâtel (CH)

(73) Assignee: EM MICROELECTRONIC-MARIN SA, Marin (CH)

( * ) Notice: Subject to any disclaimer, the term of this patent is extended or adjusted under 35 U.S.C. 154(b) by 0 days.

(21) Appl. No.: 18/069,581

(22) Filed: Dec. 21, 2022

(65) Prior Publication Data

US 2023/0205332 A1 Jun. 29, 2023

(30) Foreign Application Priority Data

Dec. 29, 2021 (EP) .................................... 21218215

(51) Int. Cl.
*G06F 3/038* (2013.01)
*G06F 3/03* (2006.01)
*H04N 25/75* (2023.01)

(52) U.S. Cl.
CPC .......... *G06F 3/0383* (2013.01); *G06F 3/0317* (2013.01); *G06F 3/0325* (2013.01); *H04N 25/75* (2023.01)

(58) Field of Classification Search
CPC ..... G06F 3/0317; G06F 3/0325; G06F 3/0383
See application file for complete search history.

(56) References Cited

U.S. PATENT DOCUMENTS

| 8,451,227 | B2 * | 5/2013 | Chao ..................... G06F 3/0317 345/593 |
| 8,497,841 | B1 * | 7/2013 | Sze ........................ G06F 3/0416 345/158 |
| 8,537,109 | B2 * | 9/2013 | Lye .......................... G06F 3/038 250/221 |
| 8,941,620 | B2 * | 1/2015 | Sze ........................ G06F 3/0425 345/175 |
| 11,029,765 | B1 * | 6/2021 | Leow ..................... G06F 3/038 |
| 2014/0306894 | A1 | 10/2014 | Lee et al. |
| 2019/0018534 | A1 * | 1/2019 | Holman .................. G06F 3/014 |

FOREIGN PATENT DOCUMENTS

WO 2006063981 A1 6/2006

OTHER PUBLICATIONS

European Search Report for EP 21218215 dated May 10, 2022.

\* cited by examiner

*Primary Examiner* — Gene W Lee
(74) *Attorney, Agent, or Firm* — Sughrue Mion, PLLC

(57) ABSTRACT

A displacement detection circuit (100) configured to implement a displacement detection method (500) for a pointing device (199) having at least one pixel array (190). The displacement detection circuit (100) includes at least one main calculator (110), at least one auxiliary calculator (111, 112, 113), at least one comparator (130) and at least one motion detector (150). The main calculator (110) is configured to calculate at least one main average (210) corresponding to the average of the at least one pixel array (190), which is compared to at least one auxiliary average (211, 212, 213) of the at least one auxiliary calculator (111, 112, 113). According to the result of the comparison, the at least one motion detector (150) indicates at least one direction (250) of displacement of the pointing device (199).

10 Claims, 4 Drawing Sheets

DISPLACEMENT DETECTION CIRCUIT AND METHOD THEREOF

CROSS-REFERENCE TO RELATED APPLICATIONS

This application claims priority to European Patent Application No. 21218215.8 filed Dec. 29, 2021, the entire contents of which are incorporated herein by reference.

TECHNICAL FIELD

The present invention relates to pointing devices, in particular for controlling the position of a cursor on a screen, such as the display of a personal computer. Such pointing devices may for instance include mice for controlling the position of a cursor on a display screen.

The present invention more particularly relates to the field of optical pointing devices which comprise an optical motion sensing device including a photodetector array for measuring the varying intensity pattern of a portion of a surface which is illuminated with radiation of a light source and for extracting information about the relative motion between the photodetector array and the illuminated portion of the surface.

STATE OF THE ART

The systems were designed to detect horizontal displacements. In such systems, the distance, rather the height between the sensor and the work surface was considered as fixed and the spotlight reflected on the sensor was centered inside active area of the pixel array.

Further, during the assembly the system presents tolerances that, in turn, cause the real height to differ from the nominal height. In addition, the user of the mouse may lift it from the surface while using it. Due to the optical path made by the lens, the location of the illumination spot on the pixel array moves along one horizontal axis when the height changes This movement of the spotlight leads to many negative effects on the tracking capabilities of the sensor. On one hand, only part of the active area of the pixel array is illuminated, which means that less information are available for the sensor to measure the displacement. On the other hand, the sensor may misinterpret the movement of the spotlight as a horizontal movement of the working surface, rather than an effect of the change of height.

A method for detecting a lift of a pointing device from an illuminated surface portion is described in WO2006063981. This method uses loss-of-focus when the optical pointing device is not moving, and a second one greater than the first one is used when the optical pointing device is moving. Said method for detecting also uses a dynamical loss-of-focus threshold depending on an average number of motion features that the surface exhibits to the sensor of the optical pointing device.

SUMMARY OF THE INVENTION

The present invention aims to overcome these drawbacks, and therefore has for its object to provides a displacement detection method for at least one pixel array of a pointing device configured to be displaced on and/or from a surface in at least one direction; said at least one pixel array comprising at least one first column, at least one second column and at least one third column; said displacement detection method comprising at least one:

main calculation of at least one main average; said at least one main average corresponding to the average of said at least one pixel array;

auxiliary calculation of at least one auxiliary average; said at least one auxiliary average corresponding to the average of at least one column among said at least one first column, said at least one second column and said at least one third column;

comparison of said at least one auxiliary average with said at least one main average; and, motion detection in said at least one direction of the displacement of the pointing device.

Thanks to this configuration, said displacement detection method may detect a height variation based on the spot light and react to that in order to guarantee optimal tracking capabilities.

According to an embodiment, said at least one direction comprises at least one first direction and at least one second direction, and wherein said at least one motion detection indicates said at least one first direction if said at least one auxiliary average bigger than said at least one main average shifts in said at least one primary direction, or if said at least one auxiliary average bigger than said at least one main average shifts in said at least one secondary direction.

Thanks to this configuration, said displacement detection method may detect the displacement of the pointing device in said at least one direction.

According to an embodiment, said at least one auxiliary average comprises at least one average of said at least one first column, at least one average of said at least one second column and at least one average of said at least one third column, and which comprises at least one quantification of said displacement configured to quantify the height of the displacement when said at least one auxiliary average bigger than at least one main average shifts in said at least one direction among said at least one primary direction and said at least one secondary direction.

According to an embodiment, said displacement detection method comprises at least one zero setting; said at least one zero setting sets an actual displacement value on said surface equal to a set displacement value of said pointing device Thanks to this configuration, said at least one zero setting may be set.

According to an embodiment, said at least one motion detection comprises at least one height calculation of said pointing device in accordance with said at least one zero setting.

According to an embodiment, said at least one height calculation comprises at least one correction of the actual displacement value at a height in accordance with said set displacement value of said pointing device.

According to an embodiment, said at least one direction comprises at least one first direction and at least one second direction, and wherein said at least one motion detector is configured to indicate said at least one first direction if said at least one auxiliary average is bigger than said at least one main average, or at least one second direction if said at least one auxiliary average is smaller than said at least one main average.

Thanks to one of those configuration, said at least one motion detector may detect the displacement of the pointing device in said at least one direction.

According to an embodiment, said at least one motion detector is configured to quantify the height of the displacement when said at least one auxiliary average bigger than at least one main average shifts in said at least one direction among said at least one primary direction and said at least one secondary direction.

Thanks to one of those configurations, the height of the displacement may be quantified when said at least one auxiliary average, preferably when said majority of auxiliaries averages, is bigger or smaller than at least one main average The present invention aims to overcome these drawbacks, and therefore has for its object to provides a pointing device comprising at least one displacement detection circuit according to an embodiment of the invention configured to implement a displacement detection method according to an embodiment of the invention.

Thanks to this configuration, said displacement detection method may detect a height variation based on the spot light and react to that in order to guarantee optimal tracking capabilities.

BRIEF DESCRIPTION OF THE DRAWINGS

The foregoing and other purposes, features, aspects and advantages of the invention will become apparent from the following detailed description of the embodiments, given by way of illustration and not limitation with reference to the accompanying drawings, in which.

DESCRIPTION OF THE INVENTION

Figure 1:
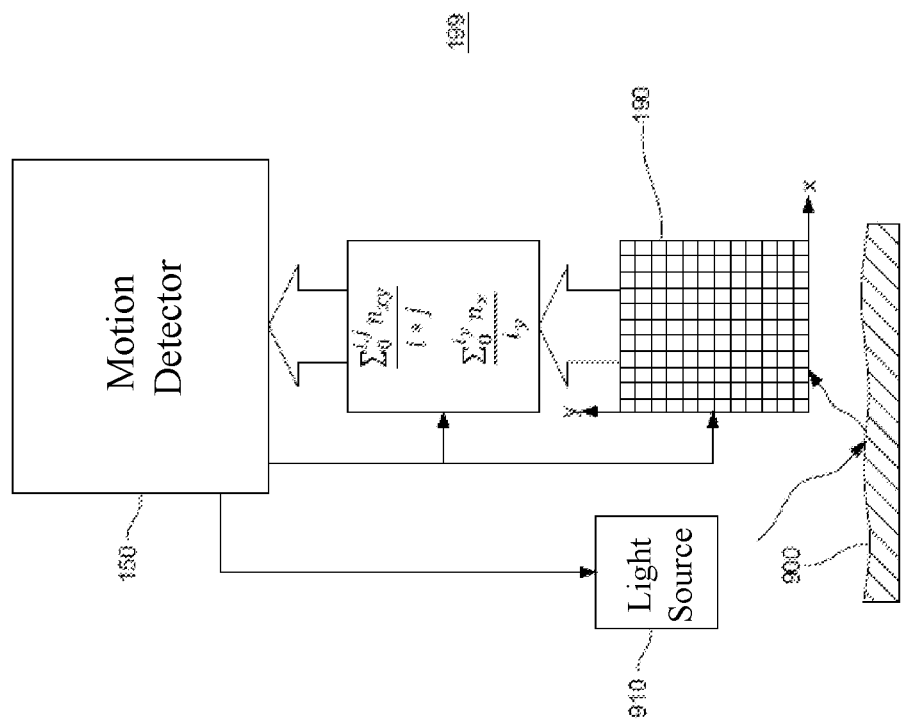
FIG. 1 represents a displacement detection circuit 100 for a pointing device 199 according to an embodiment.

FIG. 1 depicts a displacement detection circuit 100 configured to implement said displacement detection method 500 for a pointing device 199. Said pointing device 199 may comprise at least one light source 910 configured to illuminate a surface 900 and at least one pixel array 190 having at least one first column 191, at least one second column 192 and at least one third column 193, which are configured to receive reflected light from said surface 900. In the rest of the present description, it is considered that the light intensity received by a part of said at least one pixel array 190, more precisely by at least two columns among said at least one first column 191, said at least one second column 192 and said at least one third column 193 are equivalent and the third one is different.

Figure 4:
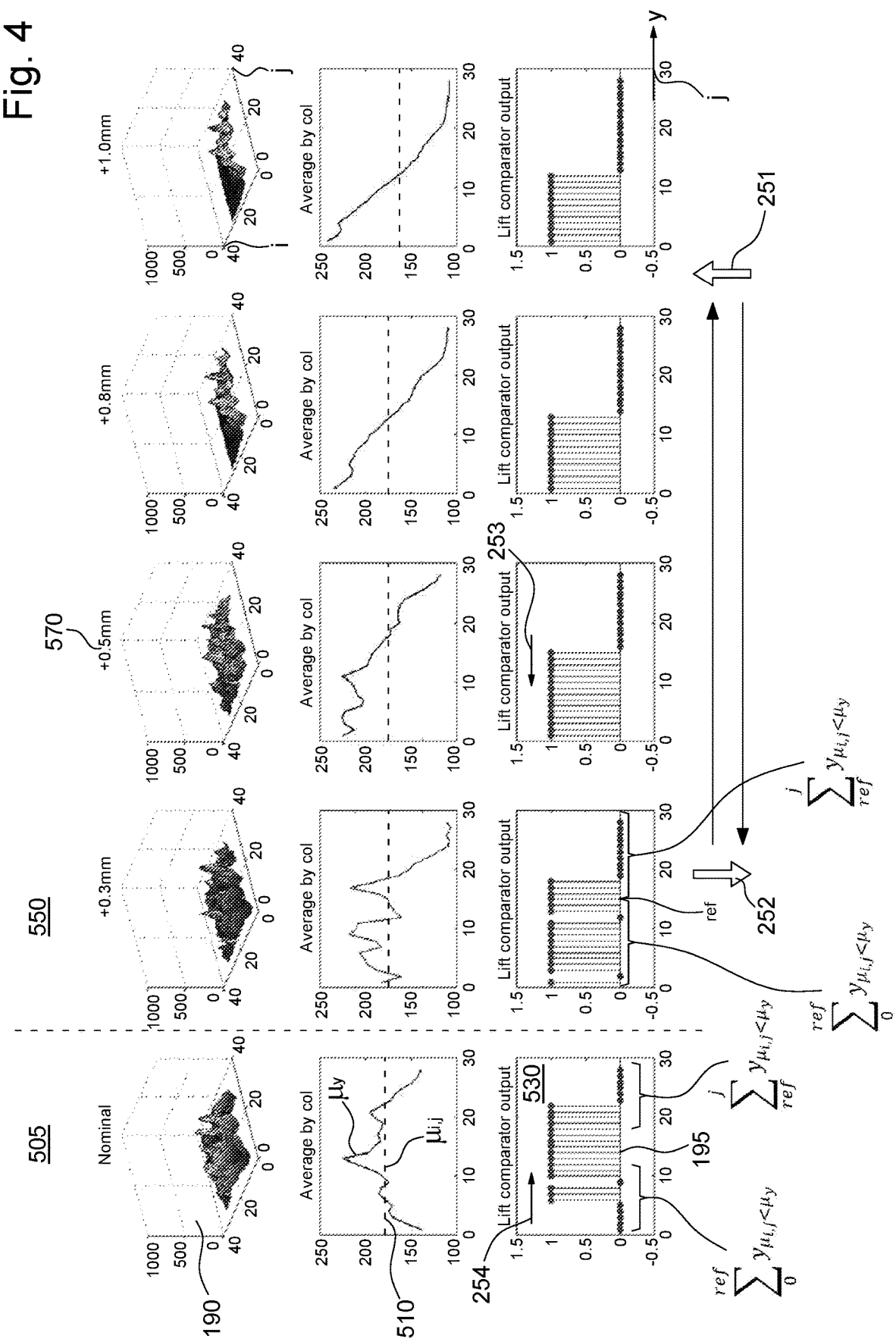
FIG. 4 represents a dynamic displacement detection method 500 when said pointing device 199 is lifted up or getting closer to said surface 900.

Since reflected light amount may vary according to asperity of said surface 900, said displacement detection method 500 may comprise at least one zero setting 505 in order to set an actual displacement value on said surface equal to a set displacement value of said pointing device 199. Indeed, said actual displacement value may be construed differently by said at least one pixel array 190, and said pointing device 199 may transmit a speed of the cursor for example slower or faster than said actual displacement value. Therefore said at least one zero setting 505 in order to set an actual displacement value on said surface equal to a set displacement value of said pointing device 199 as illustrated in FIG. 4. Of course, said at least one zero setting 505 may occur at any time during said displacement detection method 500.

Figure 2:
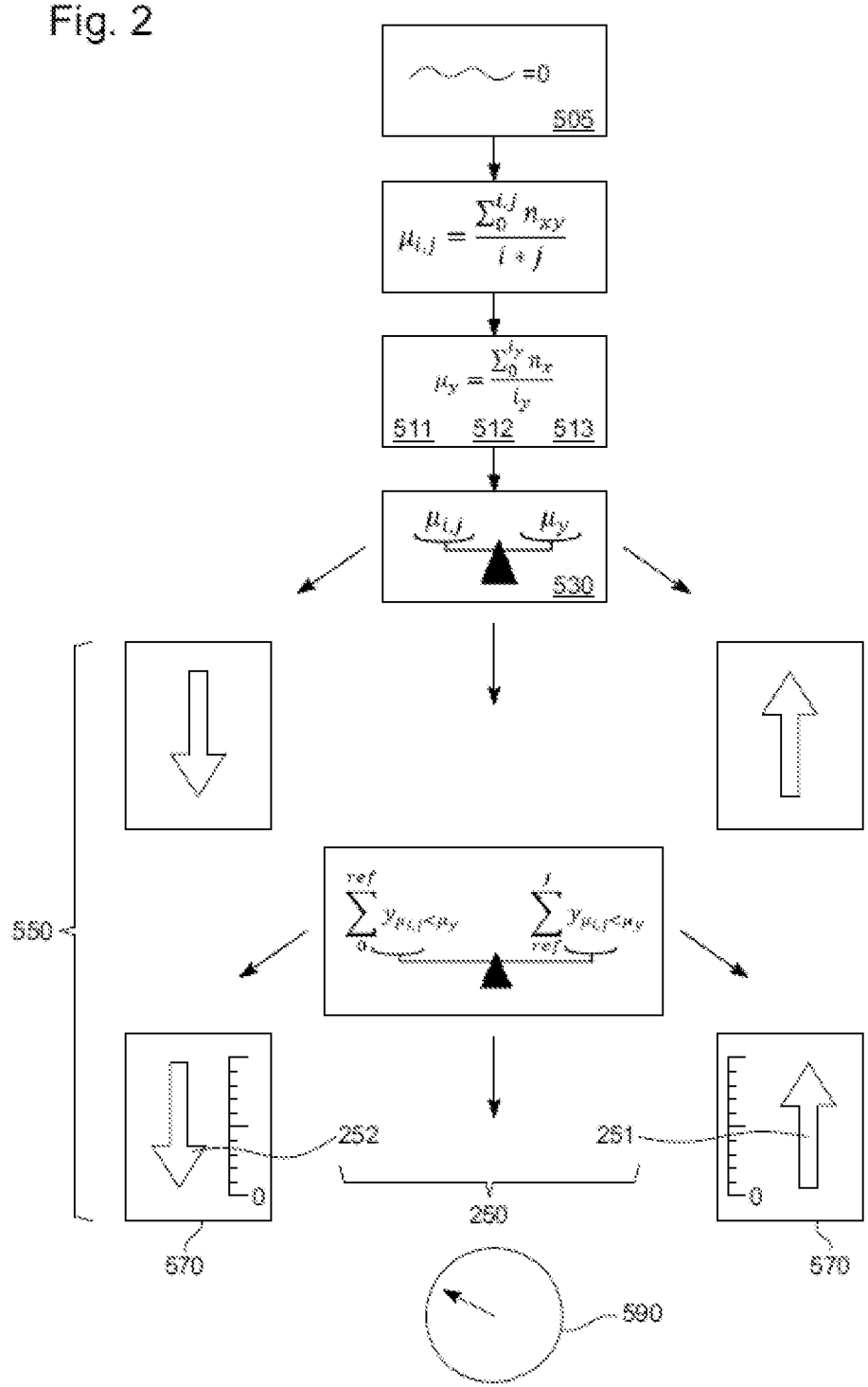
FIG. 2 depicts a displacement detection method 500 for a pointing device 199 according to an embodiment.
Figure 3:
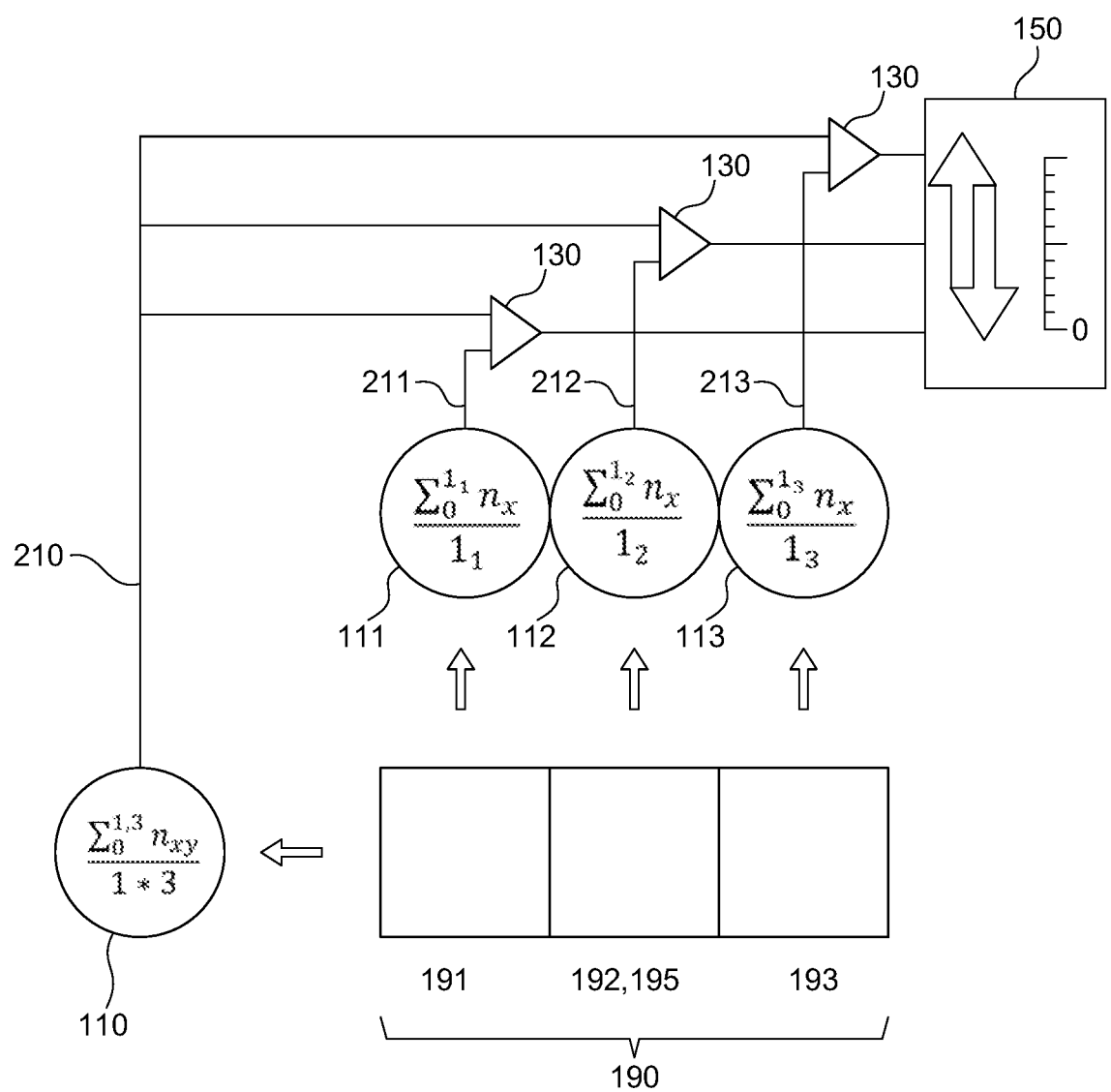
FIG. 3 illustrates said displacement detection circuit 100 implementing said displacement detection method 500 according to an embodiment.

As depicted in FIG. 2, said displacement detection circuit 100 may comprise at least one main calculator 110, at least one auxiliary calculator 111, 112, 113, at least one comparator 130 and at least one motion detector 150.

As aforementioned, said at least one pixel array 190 may receive reflected light from said surface 900, and said at least one main calculator 110 may calculate at least one main average 210 corresponding to the average of reflected light amount received by said at least one pixel array 190.

Said at least one auxiliary calculator 111, 112, 113 may calculate at least one auxiliary average 211, 212, 213, which may correspond to the average of at least one column 191, 192, 193 among said at least one first column 191, said at least one second column 192 and said at least one third column 193, preferably said at least one auxiliary average 211, 212, 213 may comprise at least one first average 211 of said at least one first column 191, at least one second average 212 of said at least one second column 192 and at least one third average 213 of said at least one third column 193. In other words, said at least one auxiliary average 211, 212, 213 may not correspond to the average of said at least one first column 191, said at least one second column 192 and said at least one third column 193, but may be a set comprising said at least one first average 211 of said at least one first column 191, said at least one second average 212 of said at least one second column 192 and said at least one third average 213 of said at least one third column 193.

Once said at least one main calculator 110 and said at least one auxiliary calculator 111, 112, 113 may have calculated said at least one main average 210 and said at least one auxiliary average 211, 212, 213, said at least one comparator 130 may compare 530, in a binary manner, said at least one auxiliary average 211, 212, 213 with said at least one main average 210, more precisely, each auxiliary average 211, 212, 213, which is said at least one first average 211, said at least one second average 212 and said at least one third average 213 may be individually compared to said at least one main average 210: if said at least one auxiliary average 211, 212, 213 is bigger than said at least one main average 210, aid at least one auxiliary average 211, 212, 213 may get a "1" otherwise it may get "0".

Said at least one primary direction 253 and said at least one secondary direction 254 may be defined according at least one reference column 195 selected among said at least one first column 191, said at least one second column 192 and said at least one third column 193. Said at least one reference column 195 may be selected during said at least one zero setting 505.

Indeed, if said at least one auxiliary average 211, 212, 213 bigger than said at least one main average 210 shifts in said at least one direction 253, 254 among said at least one primary direction 253 and said at least one secondary direction 254, said at least one motion detector 150 may indicate at least one first direction 251, i.e. said pointing device 199 may be lifted up from said surface 900. For example, if said at least one first column 191 is selected as said at least one reference column 195, said majority of auxiliaries averages 212, 213 may be shifted toward said at least one first column 191, i.e. said at least one reference column 195, and said at least one motion detector 150 may detect 550 said majority of auxiliaries averages 212, 213 shifts in said at least one primary direction 253. Regarding said at least one third column 193 selected as said at least one reference column 195, the reasoning may applies mutatis mutandis.

In case said at least one second column 192 is said at least one reference column 195, if said at least one third auxiliary average 213 bigger than said at least one main average 210 shifts toward said at least one first column 191, said at least one motion detector 150 may detect 550 a shift in said at least one primary direction 253, and said at least one motion detector 150 may indicate at least one first direction 251, i.e. said pointing device 199 may lift up from said surface 900. Considering that said at least one second column 192 still being said at least one reference column 195, said at least one first auxiliary average 211 bigger than said at least one main average 210 shifts toward said at least one third column 193, said at least one motion detector 150 may detect 550 a shift in said at least one secondary direction 254, and said at least one motion detector 150 may indicate at least one second direction 252, i.e. said pointing device 199 may get closer to said surface 900.

Effectively, since said pointing device 199 may be slightly elevated, said reflected light received by said at least one pixel array 190 may shift, and as consequences said reflected light may first illuminate said at least one first column 191, said at least one second column 192 and said at least one third column 193 when said pointing device 199 is on the surface and when said pointing device 199 is slightly elevated, said reflected light may only illuminate said at least one first column 191 and said at least one second column 192. In this case, if said at least one second column 192 is said at least one reference column 195, said at least one comparator 130 may compare 530 said at least one auxiliary average 211, 213 with said at least one main average 210 and said at least one motion detector 150 may detect 550 said at least one first direction 251 of displacement of the pointing device 199, since said majority of auxiliaries averages 211, 213 shifts in said at least one primary direction 253.

Thanks to said at least one comparison 530, said at least one motion detector 150 may quantify 570 the height of the displacement when said at least one auxiliary average 211, 212, 213, preferably when said majority of auxiliaries averages 211, 212, 213, bigger than said at least one main average 210, more precisely said at least one quantification 570 of said displacement may quantify 570 the height of the displacement by counting the number of said at least one auxiliary average 211, 212, 213 shifting in said at least one primary direction 253 or in said at least one secondary direction 254 according to said at least one reference column 195. Said at least one height calculation of said pointing device 199 is realised in accordance with said at least one zero setting 505.

Indeed, in this example, said at least one second column 192 may be said at least one reference column 195, and when said at least one zero setting 505 is realized, all columns 191, 192, 193 may receive reflected light. However, said light intensity received by said at least two columns among said at least one first column 191, said at least one second column 192 and said at least one third column 193 are equivalent and the third one is different, preferably lower. As soon as said pointing device 199 may be slightly elevated, said reflected light received by said at least one pixel array 190 may shift, and said reflected light may illuminate only said at least one first column 191 and said at least one second column 192 with an equivalent intensity. As consequences, said at least one quantification 570 may count said at least one first column 191 and said at least one second column 192, and may quantify 570 the height of the displacement which may be 0.5 mm for instance. If said pointing device 199 may be further elevated or lifted up, said reflected light received by said at least one pixel array 190 may shift further, and said reflected light may illuminate only said at least one first column 191 and said at least one second column 192 and said at least one third column 193 may receive almost no light, which means the value of the received light intensity is near to zero. As a result, said at least one quantification 570 may count only said at least one first column 191 on one side of said at least one reference column 195 and may quantify 570 the height of the displacement which may be 1 mm for example. Of course, the height of the displacement may be more or less than 0.5 mm or 1 mm since said at least one height calculation of said pointing device 199 in accordance with said at least one zero setting 505.

As aforementioned, when said pointing device 199 is slightly elevated, said reflected light may illuminate less said at least one column 191, 192, and said pointing device 199 may transmit a speed of the cursor slower than said actual displacement value for example. Indeed, said displacement detection method 500 may detect a height variation based on the spot light and react to that in order to guarantee optimal tracking capabilities. Said at least one height calculation hence may comprise at least one correction 590 of the actual displacement value at a height in accordance with said set displacement value of said pointing device 199, which to some extend also correct the speed of the cursor.

FIG. 4 depicts said displacement detection method 500 for said pointing device 199 in a dynamic way. As it may be observed, said at least one zero setting 505 may occurs in order to set an actual displacement value on said surface equal to a set displacement value of said pointing device 199.

Then, said at least one main calculator 110 may calculate at least one main average 210, $\mu_{i,j}$ for short, corresponding to the average of reflected light amount received by said at least one pixel array 190, and said at least one auxiliary calculator 111, 112, 113 may calculate at least one auxiliary average 211, 212, 213, which may correspond to the average of said at least one column 191, 192, 193, $\mu_y$ where y may represent said at least one column.

Once said at least one main calculator 110 and said at least one auxiliary calculator 111, 112, 113 may have calculated said at least one main average $\mu_{i,j}$ and said at least one auxiliary average $\mu_y$, said at least one comparator 130 may compare 530 said at least one auxiliary average 211, 212, 213. The outcome of said at least one comparison 530 may be a binary result as depicted in FIG. 4.

According to the outcome of said at least one comparison 530 of said at least one auxiliary average $\mu_y$ with said at least one main average $\mu_{i,j}$ and/or with said at least one reference column, ref for short, said at least one motion detector 150 may detect 550 at least one direction 250 of displacement of the pointing device 199.

Indeed, if said majority of auxiliaries averages $\mu_y$ shifts in said at least one primary direction 253, i.e. on one side of said at least one reference column ref, said at least one motion detector 150 may indicate at least one first direction 251, i.e. said pointing device 199 may be lifted up from said surface 900.

The invention claimed is:

1. A displacement detection method for a pixel array of a pointing device configured to be displaced on and/or from a surface in at least one direction; said pixel array comprising a first column, a second column and a third column; said displacement detection method comprising:
   a main calculation of a main average, said main average corresponding to the average of said pixel array;

an auxiliary calculation of an auxiliary average, said auxiliary average corresponding to the average of one column among said first column, said second column and said third column;

a comparison of said auxiliary average with said main average; and a motion detection in said at least one direction of the displacement of the pointing device.

2. The displacement detection method according to claim 1, wherein said at least one direction comprises a first direction and a second direction, and wherein said motion detection indicates said first direction if said auxiliary average bigger than said main average shifts in a primary direction, or if said auxiliary average bigger than said main average shifts in a secondary direction.

3. The displacement detection method according to claim 1, wherein said auxiliary average comprises one average of said first column, one average of said second column and one average of said third column, and which comprises one quantification of said displacement configured to quantify the height of the displacement according to the number of said auxiliary average bigger than a main average shifts in said at least one direction among said primary direction and said secondary direction.

4. The displacement detection method according to claim 1, which comprises a zero setting; said zero setting sets an actual displacement value on said surface equal to a set displacement value of said pointing device.

5. The displacement detection method according to claim 4, wherein said motion detection comprises a height calculation of said pointing device in accordance with said zero setting.

6. The displacement detection method according to claim 5, wherein said height calculation comprises a correction of the actual displacement value at a height in accordance with said set displacement value of said pointing device.

7. A displacement detection circuit configured to implement said displacement detection method according to claim 1, for a pointing device having a pixel array; said pixel array comprising a first column, a second column and a third column; said displacement detection circuit comprising:

a main calculator; said main calculator being configured to calculate the main average, said main average corresponding to the average of said pixel array;

an auxiliary calculator, said auxiliary calculator being configured to calculate the auxiliary average, said auxiliary average corresponding to the average of one column among said first column, said second column and said third column;

a comparator, said comparator being configured to compare said auxiliary average with said main average; and a motion detector, said motion detector being configured to detect at least one direction of displacement of the pointing device.

8. The displacement detection circuit according to claim 7, wherein said direction comprises a first direction and a second direction, and wherein said motion detector is configured to indicate said first direction if said auxiliary average is bigger than said main average shifts in said primary direction, or if said auxiliary average is bigger than said main average shifts in said secondary direction.

9. The displacement detection circuit according to claim 7, wherein said motion detector is configured to quantify the height of the displacement when said auxiliary average is bigger than said main average shifts in said direction among said primary direction and said secondary direction.

10. A pointing device comprising at least one displacement detection circuit according to claim 7.

* * * * *